William Dickenson, INVENTOR

W. DICKENSON.
CAR FENDER.
APPLICATION FILED JUNE 29, 1912.

1,067,006.

Patented July 8, 1913.

2 SHEETS—SHEET 2.

WITNESSES
Howard D. Orr
H. F. Riley

William Dickenson, INVENTOR,
BY
E. G. Siggers
ATTORNEY

UNITED STATES PATENT OFFICE.

WILLIAM DICKENSON, OF NEW ORLEANS, LOUISIANA, ASSIGNOR OF ONE-HALF TO HENRY J. DRESSEL, OF NEW ORLEANS, LOUISIANA.

CAR-FENDER.

1,067,006.  Specification of Letters Patent. Patented July 8, 1913.

Application filed June 29, 1912. Serial No. 706,716.

*To all whom it may concern:*

Be it known that I, WILLIAM DICKENSON, a citizen of the United States, residing at New Orleans, in the parish of Orleans and State of Louisiana, have invented a new and useful Car-Fender, of which the following is a specification.

The invention relates to improvements in car fenders.

The object of the present invention is to improve the construction of car fenders, and to provide a simple, practical and efficient car fender of great strength and durability, designed for use on street cars and adapted to be supported normally above the track clear of the rails and the road bed, and capable of being instantly dropped to the track and of picking up a person in any position whether standing, sitting or lying down and of effectually preventing an object on the track from getting under it and being run over by the car on which the fender is mounted.

A further object of the invention is to provide a tripping device arranged in close proximity to the reverse lever of the controller of a car, and capable of being operated by a motorman without interfering with his control of a car in stopping the same and without causing either loss of time or confusion in dropping the fender.

The invention also has for its object to provide a fender of this character, adapted to be folded out of the way against the dash board of a car so that it will not interfere with the coupling of the car or take up any extra room in a car barn.

With these and other objects in view, the invention consists in the construction and novel combination of parts hereinafter fully described, illustrated in the accompanying drawings, and pointed out in the claims hereto appended, it being understood that various changes in the form, proportion, size and minor details of construction, within the scope of the claims, may be resorted to without departing from the spirit or sacrificing any of the advantages of the invention.

Figure 1:
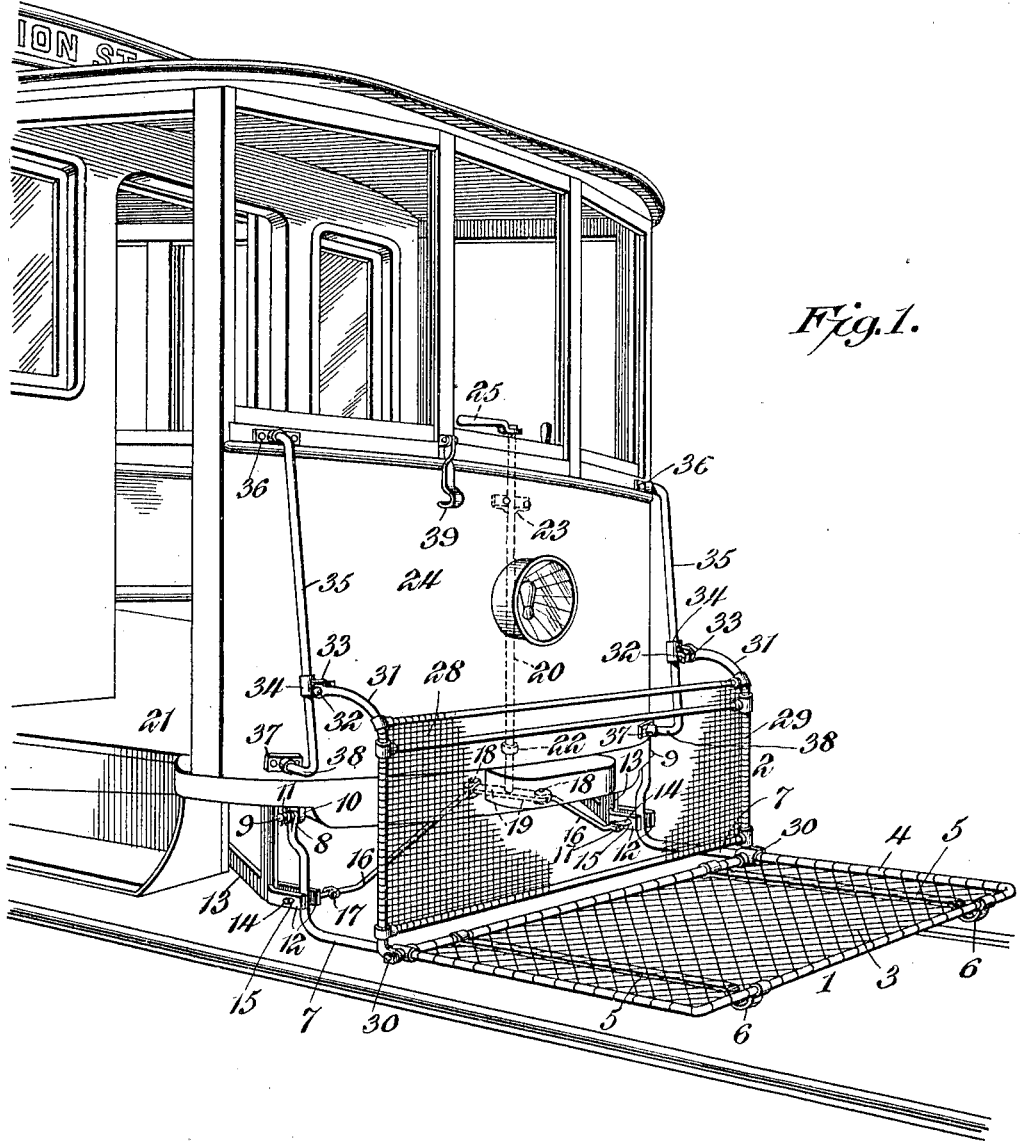
Figure 2:
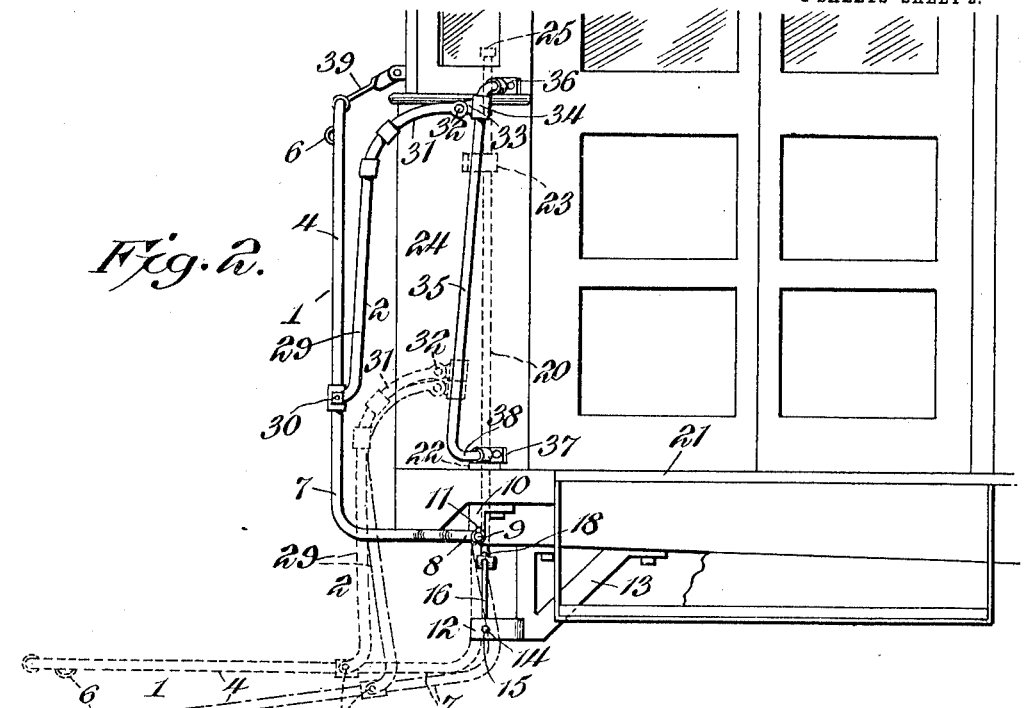
Figure 3:
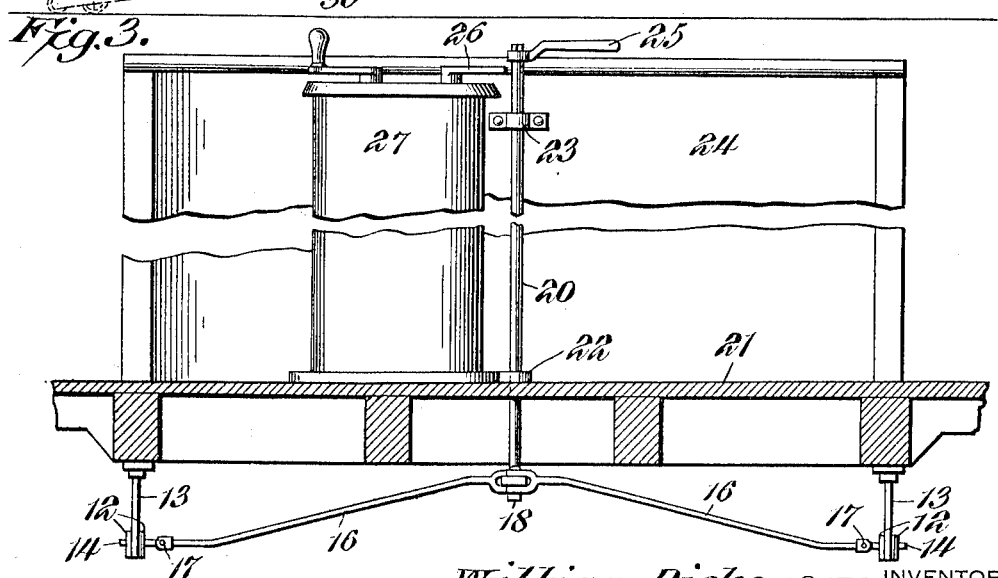

In the drawings:—Figure 1 is a perspective view of a car fender, constructed in accordance with this invention, and shown applied to a car, the fender being arranged in its normal position. Fig. 2 is a side elevation of the same, the fender being shown folded in full lines and the normal and drop positions being illustrated in dotted lines. Fig. 3 is a transverse sectional view, illustrating the tripping mechanism for dropping the fender.

Like numerals of reference designate corresponding parts in all the figures of the drawings.

In the accompanying drawings in which is illustrated the preferred embodiment of the invention, the car fender comprises in its construction a bottom horizontal portion or member 1, and an approximately vertical back portion or rear member 2, which extends upwardly from the bottom member 1 at the back thereof. The bottom portion or member 1 consists preferably of netting 3, or other suitable material stretched on a rectangular frame 4, constructed of rod metal either tubular or solid and composed of side bars and front and rear transverse connecting bars and preferably braced at opposite sides by longitudinal bars 5, constructed of flat metal and secured to the front and rear transverse rods or bars and provided adjacent to their front ends with depending curved bends 6, adapted to run on the road bed while the front of the bottom frame 4 of the fender rests upon the rails.

The bottom member of the fender is provided at the back with approximately L-shaped arms 7 extending rearwardly from the side bars of the frame 4 and upwardly in spaced relation with the rear upright member 2 of the fender and provided at their upper ends with eyes 8 through which pass pivots 9, projecting laterally from lugs 10, which depend from the underside of the car. The upper terminals of the arms are retained on the horizontal pivots 9 by cotter pins 11, or other suitable fastening means, and the said arms may be pivotally hung from the car in any other preferred manner.

The upwardly extending portions of the L-shaped arms 7 are arranged between spaced jaws 12, consisting of projecting lugs or ears and extending forwardly from the bottoms of the brackets 13 and forming horizontal guides, and adapted to brace the arms against lateral movement. The brackets 13 consist of vertical front portions and inclined rear portions or braces and are suitably secured at the top to the underside of the car. The arms 7 are normally supported at the front outer portion of the space between the forwardly projecting portions or jaws 12 by transverse pins 14, arranged in alined perforations 15 of the projecting portions or jaws and provided at their inner ends with heads, which are connected to the outer ends of transverse rods 16 by pivots 17. The rods are provided at their outer ends with bifurcations to receive the pins, and their inner ends, which are also bifurcated, are connected by suitable pivots 18 to opposite horizontal arms 19 of a vertical operating shaft 20. The vertical shaft extends through the platform 21 of the car and is provided with a collar 22 resting upon the bottom of the car and supporting the shaft at the proper elevation. The upper portion of the shaft is mounted in a suitable bearing 23, preferably consisting of a metallic strap bent or bowed at an intermediate point to brace the shaft and riveted or otherwise secured to the inner face of the dash board 24 of the car. The upper end of the shaft 20 is equipped with a suitable handle 25, located adjacent to the reverse lever 26 of the controller 27 and adapted to be swung rearwardly or in the direction of the motorman for rotating the operating shaft 22 to withdraw the pins 14 and permit the forwardly extending bottom member to drop from a horizontal position to the inclined position illustrated in dotted lines in Fig. 2 of the drawings, and rest upon the track. When a motorman operating a car is on the eve of an accident, his first impulse after cutting off the power and applying the brake is to reverse his car. This he does by pulling back the reverse lever 26 on the controller, and as the handle 25 of the operating shaft is placed just ahead of the reverse lever at one side thereof, it can be instantly pulled back with the same motion of the hand as is used in pulling back the reverse lever. When in its dropped inclined position the fender is adapted to take up a person or other object and will effectually prevent the same from getting under it and being run over by the car. The fender may be readily returned to its normal horizontal position by swinging it forwardly and upwardly and replacing the pins in the perforations 15 of the projecting portions or jaws of the brackets.

The upwardly extending rear member, which constitutes the back of the fender, consists of netting 28 stretched on a rectangular frame 29, constructed of rod metal or other suitable material and composed of approximately vertical side bars and upper and lower horizontal connecting bars or rods. The side bars or rods are pivoted at their lower ends by bolts 30, or other suitable fastening devices, to the frame 4 at the back thereof, and they are provided at their upper ends with arms 31 curved upwardly and rearwardly and connected by bolts 32 or other suitable pivots to forwardly projecting ears 33 of sleeves 34, which are slidably mounted on side guides 35. The side guides 35 consist of slightly inclined rods spaced from the dash board 24 of the car and secured at their upper and lower ends to the latter by attaching plates 36 and 37. The guide rods are provided at their lower ends with short arms 38, which forwardly offset the lower portions of the guide rods from the plane of the upper ends thereof. The fender is adapted to be folded upwardly and when the bottom member 1 is swung upwardly, the rear member 2 slides upwardly on the guide rods and the members 1 and 2 occupy a position above the car coupling and do not interfere with the coupling of the car to another car or take up any additional room in a car barn. The car is equipped with a hook 39 pivoted adjacent to the top of the dash and arranged to engage the free front edge of the lower member 1 of the fender. The hook forms a gravity latch for retaining the fender in its folded position. The fender is not provided with ropes, chains or springs liable to get out of order.

What is claimed is:—

1. The combination with a car provided with a pair of spaced projecting lugs, a transverse pin piercing the lugs at a point intermediate of the ends of the same and extending across the space between the said lugs, a fender pivotally mounted on the car above the horizontal plane of the lugs and normally resting against and supported by the said pin in the outer or front portion of the space between the lugs, and means for withdrawing the pin to permit the fender to swing rearwardly into the inner portion of the space between the said lugs to drop the outer portion of the fender.

2. The combination of projecting jaws arranged in pairs and provided with alined openings, the members of said pairs being spaced apart to provide intervening spaces, pins normally arranged in the openings and extending across the said spaces at a point intermediate of the ends thereof, a pivotally mounted fender having arms extending between the jaws and supported in a forward position by the said pins to maintain the fender normally elevated, a vertical operating shaft provided at its upper end with operating means and having oppositely disposed arms at the lower portion, and rods connecting the arms of the shaft with the pins, said shaft being adapted to be turned to withdraw the pins and permit the fender to drop.

3. The combination with a car, of brackets depending from the car and having forwardly projecting jaws forming intervening spaces open at the outer ends of the jaws, the latter being also provided with transversely alined openings, pins normally arranged in the openings of the jaws and extending across the said spaces at points intermediate of the ends of the said jaws, a fender provided at the back with approximately L-shaped arms pivotally hung at their upper ends from the car and extending into the spaces between the jaws and supported in a forward position by the said pins, and operating means mounted on the car and connected with the pins for withdrawing the same to permit the fender to drop.

4. The combination with a car, of upright guide rods arranged at the front of the car at opposite sides of the dash board, brackets depending from the car, removable pins mounted in the brackets, a fender composed of a bottom member provided at the back with arms extending rearwardly and upwardly and pivotally hung from the car in advance of the brackets and supported in a forward position by the said pins to hold the bottom member normally in an elevated position, a rear upwardly extending member pivotally connected at opposite sides with the bottom member at the back thereof and provided at the top with arms pivotally and slidably connected with the guide rods, and operating means mounted on the car for withdrawing the pins to permit the fender to drop.

5. The combination with a car, of guide rods secured to the front of the car at opposite sides thereof and inclined upwardly and rearwardly, sleeves slidable on the guide rods, a fender composed of a bottom member provided at the back with arms pivotally hung from the car, and a rear upwardly extending member pivotally connected at the bottom with the said bottom member and provided at the top with arms pivoted to the slidable sleeves, said fender being adapted to fold against the front of the car, and means for securing the fender in its folded position.

In testimony, that I claim the foregoing as my own, I have hereto affixed my signature in the presence of two witnesses.

W. DICKENSON.

Witnesses:
A. L. SAXON,
OLLE ESS.

Copies of this patent may be obtained for five cents each, by addressing the "Commissioner of Patents, Washington, D. C."